Nov. 20, 1962 T. A. DEPREZ ET AL 3,064,489
ADJUSTMENT DEVICE
Filed Oct. 18, 1960
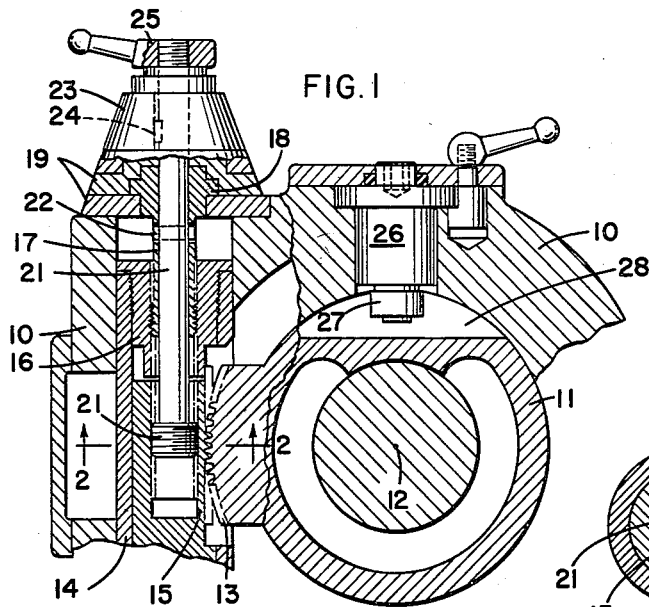
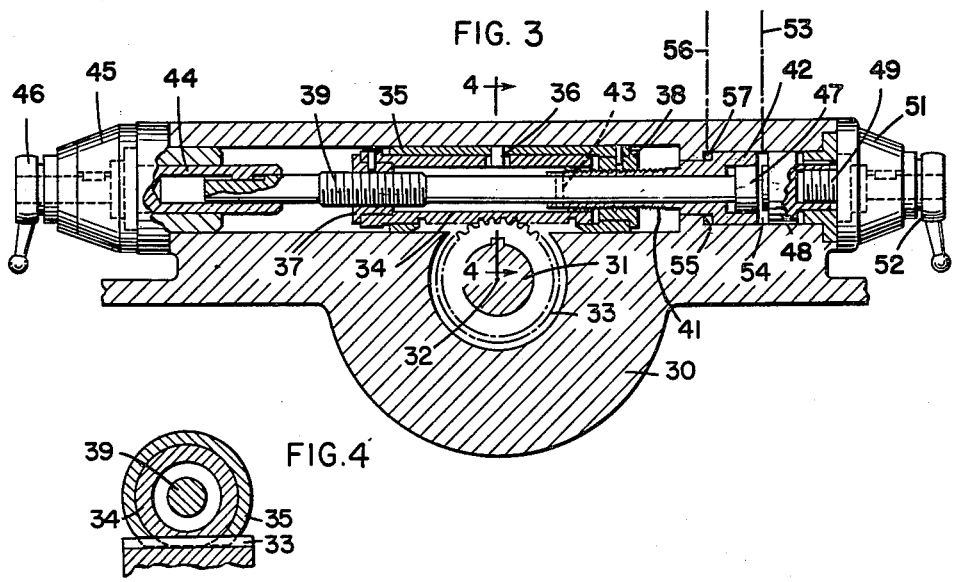
INVENTORS
THOMAS A. DEPREZ
EDWIN A. HEDIGER
BY
Richard W. Treverton
ATTORNEY

United States Patent Office 3,064,489
Patented Nov. 20, 1962

3,064,489
ADJUSTMENT DEVICE
Thomas A. Deprez and Edwin A. Hediger, Rochester, N.Y., assignors to The Gleason Works, Rochester, N.Y., a corporation of New York
Filed Oct. 18, 1960, Ser. No. 63,396
14 Claims. (Cl. 74—409)

The present invention relates to an improved device for making angular adjustments in machine tools, and the like, and for taking up backlash and clamping the adjusted parts.

An adjustment device according to the invention comprises two members connected for relative angular motion, a pinion secured to one member with its axis coincident with the axis of such angular motion, two racks slidable on the other member and also relatively to each other and meshing with the pinion, two coaxial screws threaded respectively to the racks and being connected to each other for co-rotation and relative axial motion, the screws being rotatable in said other member to move the racks along the screws and thereby effect angular motion of the pinion and said one member relative to said other member, means for supporting one screw against axial motion relative to said other member, and means for applying an axial force to the other screw for eliminating backlash between said other member, screws, rack and pinion and for clamping them together. The means for applying the axial force to said other screw may conveniently comprise a clamp element screw-threaded to said other screw and backed by said other member.

The invention is also applicable to a case, as for example in the cutter sharpening machine disclosed in the co-pending application Serial No. 63,414 of Leonard O. Carlsen and Thomas A. Deprez filed on even date herewith, where it is desired to have two positions of angular adjustment, with provision for back and forth movement between these positions and clamping of the adjusted parts in both positions. The preferred form of adjustment device for this condition also comprises the two members connected for relative angular motion, the pinion, the two racks and the two screws, arranged substantially as described above. The device further comprises a first piston on one screw slidable in a cylinder in said other member and adapted for abutment with one end of the cylinder to limit axial motion of said one screw in one direction, said piston having a cylinder therein, a second piston on the other screw slidable in the last-mentioned cylinder, a stop adjustable on said other member for limiting axial motion of the other screw in the opposite direction, and means for (a) applying pressure against said pistons to move them to a position wherein the first piston abuts said one end of the cylinder and to further move the second piston relative to the first to eliminate backlash between said other member, screws, racks and pinion, and, alternatively, (b) applying pressure against the first piston to cause it to move the second piston into abutment with the adjustable stop and to move relative to the second piston, also to eliminate such backlash.

Preferred embodiments of the invention are shown in accompanying drawings wherein:

FIG. 1 is a section through a portion of a machine tool in planes perpendicular to an axis of angular adjustment;

FIG. 2 is a detail section in plane 2—2 of FIG. 1;

FIG. 3 illustrates a modified form of the invention and, like FIG. 1, is a section through a portion of a machine tool in a plane perpendicular to an angular adjustment axis; and FIG. 4 is a detail section in plane 4—4 of FIG. 3.

The portion of the machine tool shown in FIGS. 1 and 2 comprises a support member 10 in which another member 11 is relatively adjustable about axis 12. The particular members 10 and 11 comprise the cutter head and cutter spindle housing of the cutter sharpening machine disclosed in the aforesaid application of Carlsen and Deprez. However insofar as concerns the present invention it is immaterial whether the support 10 is movable about axis 12 and the member 11 stationary, or vice versa, or whether both parts 10 and 11 partake of the motion, and it is also immaterial whether support 10 is borne by member 11 or vice versa. For effecting the relative angular adjustment a segmental gear or pinion 13 is secured to or integral with member 11 and a pair of telescoping racks 14 and 15 whose teeth mesh with the pinion are slidable in a bore in support 10 and upon each other, but are held against rotation by the pinion.

A nut 16 secured rigidly to our unitary with rack 14 is screw-threaded to a tubular screw 17 which is held against axial motion by having a flange 18 which is confined between thrust plates 19 secured to support 10. A screw 21, coaxial with screw 17 and having its shank extending through the latter, is screw-threaded to the rack 15. A pin 22 extending diametrically through the shank of screw 21 is engaged in an elongated longitudinal slot in screw 17 to cause the two screws to rotate in unison while permitting them relative axial motion. The screw-threaded portions of the screws that are threaded to nut 16 and rack 15 are of the same lead, so that upon rotation of the screws the two racks are moved in unison in support 10 to cause rotation of pinion 13 and member 11 relative to the support.

A dial 23 is axially movable on the screw 21 but is connected to it for co-rotation by a key 24. The dial is confined against axial displacement by the adjacent thrust plate 19 and a clamp nut 25 which is screw-threaded onto the screw 21.

Relative adjustment of members 10 and 11 about axis 12 is effected by first loosening the nut 25 and then turning the screws either by manually rotating the dial or by means of a wrench applied to a socket in the outer end of screw 21. After such adjustment, and while holding the screw 21 stationary, the nut 25 may be tightened to thereby draw screw 21 axially relative to screw 17 and so take up backlash between the pinion and racks, and between the racks and the screws, and clamp the assembly. The reaction from nut 25 is transmitted through the dial to the thrust plates. Preferably backlash is continuously taken up during the adjustment by a spring, not shown, which is arranged between racks 14 and 15 in a manner to urge rack 15 upwardly in FIG. 1 relative to rack 14.

In the particular machine partially illustrated, the members 10 and 11 are also relatively adjustable along the axis 12 upon release of the clamp nut 25. Such adjustment is effected by turning, by means of a suitable wrench, a stub shaft 26 that is journaled in support 10 and has an eccentrically disposed roller 27 engaged in a transverse slot 28 in member 11. The teeth of the rack-and-pinion adjustment means 14, 15, 13, preferably are straight and extend parallel to axis 12 so that the respective adjustments along and about the latter axis have no effect upon each other.

The modified adjustment means shown in FIGS. 3 and 4 has provision for two positions of angular adjustment between a support member 30 and another member 31 which are relatively movable about an axis 32. The particular support 30 and member 31 illustrated are parts of the cutter head bracket and cutter head of the cutter sharpening machine of the aforementioned application of Carlsen and Deprez. A pinion 33 secured to member 31 meshes with telescoping racks 34 and 35 which are slidable in a bore in support 30 and upon each other, but are held against relative rotation by a pin 36 which is secured to rack 35 and extends through a longitudinal slot in rack 34. The racks are secured to nuts 37, 38, respectively. Nut 37 is threaded to a screw 39, and nut 38 is threaded to a tubular screw 41 telescoped over the shank of screw 39 and having on one end a tubular piston 42 slidable in a cylinder in support 30. The screws are of the same lead and are relatively movable axially but are connected for co-rotation by a pin 43 which is secured to screw 39 and extends through a longitudinal slot in screw 41. One end of screw 39 is splined to a shaft 44 which is rotatable but axially immovable in support 30. A calibrated dial 45 is keyed to shaft 44, and by turning the dial the racks are adjusted along the screws, and after such adjustment the shaft 44 may be secured to support 30 by tightening a clamp nut 46 that is screw-threaded onto it.

On the opposite end of screw 39 a piston 47 is secured. This piston is slidable in the tubular piston 42 and is adapted to abut the head of a stop nut 48 which is slidable axially but is non-rotatable in support 30. A screw 49 is rotatable but axially immovable in support 30 and bears a calibrated dial 51. By turning the screw and dial the nut 48 may be adjusted axially in support 30. Screw 49 may then be secured to the support by tightening a clamp nut 52 which is screw-threaded to it.

The arrangement is such that by application of hydraulic pressure through a conduit 53 to cylinder chamber 54 the tubular piston is moved to the left in FIG. 3 until it abuts cylinder end wall 55, moving with it the racks and effecting relative counterclockwise rotation of member 31 to a limit position determined by adjustment of dial 45. The pressure in chamber 54 urges continued motion to the left of piston 47 and screw 39 relative to piston 42, and takes up backlash between screw 41 and nut 38, screw 39 and nut 37, and racks 34 and 35 and pinion 33. Maintenance of the pressure holds the parts clamped in this condition. Release of pressure from chamber 54 and application of pressure to chamber 57 through a conduit 56 moves the pistons to the right and the member 31 clockwise to a second limit position determined by adjustment of calibrated dial 51. This position is reached when piston 47 abuts the head of stop nut 48. Continuation of motion of piston 42 by the pressure in chamber 55 takes up backlash as before, between the screws 39, 41 and nuts 37, 38 and between racks 34, 35 and pinion 33. So long as pressure is maintained in chamber 55 the parts are held clamped in this condition.

The reversal of the hydraulic pressure and exhaust connections to conduit 53, 56 thus serves to effect relative movement between two adjusted positions of support 30 and member 31 without disturbing the adjustment settings made by means of dials 45, 51.

In both of the above described embodiments the movable parts after adjustment are clamped in predetermined relation to a reference part of the machine, i.e. to plates 19 in the case of FIG. 1 and to cylinder end wall 55 or the support for screw 49 in the case of FIG. 3. Accordingly the actual positions of the adjusted parts correspond accurately to the positions of the adjusting dials.

Having now described preferred embodiments and their operation, what is claimed as the invention is:

1. An adjustment device comprising two members connected for relative angular motion, a pinion secured to one member with its axis coincident with the axis of such angular motion, two racks slidable on the other member and also relatively to each other and meshing with the pinion, two coaxial screws threaded respectively to the racks and being connected to each other for co-rotation and relative axial motion, the screws being rotatable in said other member to move the racks along the screws and thereby effect angular motion of the pinion and said one member relative to the other member, means for supporting one screw against axial motion relative to said other member, and means for applying an axial force to the other screw for eliminating backlash between said other member, screws, rack and pinion and for clamping them together.

2. A device according to claim 1 in which said means for applying an axial force to said other screw comprises a clamp member screw-threaded to said other screw and backed by said other member.

3. A device according to claim 2 in which there is an annular dial on said other screw connected for rotation therewith and for axial motion relative thereto, said dial being interposed between said clamp member and said means for supporting one screw, said other member and said dial bearing cooperating indicia to show the position of relative adjustment of said members.

4. A device according to claim 1 in which there is a means for adjusting said one screw axially in said other member.

5. A device according to claim 1 in which there is a means for moving said one screw axially back and forth between two limit positions relative to said other member.

6. A device according to claim 5 in which there is an adjusting element rotatable in said other member and connected to the other screw for rotation therewith, the connection permitting axial motion of said other screw, and clamp means for securing said adjusting element against rotation in said other member.

7. A device according to claim 5 in which there is an adjustable stop to limit the stroke of said axial motion of said one screw.

8. A device according to claim 5 in which the means for moving the screw axially back and forth comprises a hydraulic cylinder and piston of which one is on the screw and the other on said other member.

9. A device according to claim 8 in which the means for aplying an axial force to the other screw comprises a hydraulically actuated piston on said other screw.

10. A device according to claim 9 in which the last-mentioned piston is arranged for actuation by the pressure of hydraulic fluid in the cylinder which also acts against the first-mentioned piston.

11. A device according to claim 9 in which there is one stop for abutment by one piston to limit travel in one direction and a second stop for abutment by the other piston to limit travel in the opposite direction, said other piston in the case of travel in said one direction, and said one piston in the case of travel in the opposite direction, being adapted to continue travel after such abutment to effect the elimination of backlash.

12. An adjustment device comprising two members connected for relative angular motion, a pinion secured to one member with its axis coincident with the axis of such angular motion, two racks slidable on the other member and also relatively to each other and meshing with the pinion, two coaxial screws threaded respectively to the racks and being connected to each other for co-rotation and relative axial motion, said screws being rotatable in the support to move the racks along the screws and thereby effect angular motion of the pinion and said one member relative to said other member, a first piston on one screw slidable in a cylinder in said other member and adapted for abutment with one end of the cylinder to limit axial motion of said one screw in one direction, said piston having a cylinder therein, a second piston on the other screw slidable in the last-mentioned cylinder, a stop adjustable on the support for limiting axial motion of the other screw in the opposite direction, and means for (a) applying pressure against said pistons to move them to a position wherein the first piston abuts said one end of the cylinder and to further move the second piston relative to the first to eliminate backlash between said other member, screws, racks and pinion, and, alternatively, (b) applying pressure against the first piston to cause it to move the second piston into abutment with the adjustable stop and to move relative to the second piston, also to eliminate such backlash.

13. An adjustment device comprising a support having slidable thereon an assembly having two screw-threaded sections, two coaxial screws threaded respectively to said sections and being connected to each other for co-rotation and relative axial motion, a first piston on one screw slidable in a cylinder in the supprt and adapted for abutment with one end of the cylinder to limit axial motion of the screw in one direction, said piston having a cylinder therein, a second piston on the other screw slidable in the last-mentioned cylinder, a stop on the support for limiting axial motion of the other screw in the opposite direction, and means for (*a*) applying pressure against said pistons to move them to a position wherein the first piston abuts said one end of the cylinder and to further move the second piston relative to the first to eliminate backlash between the support, assembly and screws, and, alternatively, (*b*) applying pressure against the first piston to cause it to move the second piston into abutment with said stop and to move relative to the second piston, also to eliminate such backlash.

14. An adjustment device comprising a support having slidable thereon an assembly having two screw-threaded sections, two coaxial screws threaded respectively to said sections and being connected to each other for co-rotation and relative axial motion, the screws being rotatable in said support to adjust said assembly thereon, means for supporting one screw against axial motion relative to said support, and means for applying an axial force to the other screw for eliminating backlash between said support, screws and assembly, and for clamping them together.

References Cited in the file of this patent

UNITED STATES PATENTS

| | | |
|---|---|---|
| 2,192,188 | Green | Mar. 5, 1940 |
| 2,548,603 | Hallstrand | Apr. 10, 1951 |
| 2,565,013 | Bargren | Aug. 21, 1951 |